Patented Oct. 5, 1937

2,094,809

UNITED STATES PATENT OFFICE 2,094,809

TREATMENT OF MATERIALS

Henry Charles Olpin and George Holland Ellis, Spondon, near Derby, England, assignors to Celanese Corporation of America, a corporation of Delaware No Drawing. Application June 27, 1933, Serial No. 677,848. In Great Britain July 27, 1932

13 Claims. (Cl. 8—5)

This invention relates to improvements in the treatment of materials and more particularly to a treatment of textile or other materials to render colorations thereon more fast.

In the coloration of textile and other materials it is, of course, desirable that the colors produced should be as fast as possible to light and other agencies, for example to the combined action of light and acid, e. g. acid fumes. Among dyestuffs suffering from a lack of fastness to the combined agencies of light and acids, but which are otherwise of great value for the coloration of organic derivatives of cellulose are certain anthraquinone derivatives, particularly those containing free amino or alkyl amino groups. Some of these dyestuffs yield on cellulose esters and ethers valuable shades, particularly blue shades, which are difficult to secure by other means and it is therefore a matter of great importance that an efficient method of increasing the fastness of these dyes in particular should be found.

In U. S. Patent No. 1,723,230 processes are described for increasing the fastness to light of colorations, and particularly azo dye colorations, on materials containing cellulose acetate by treating the dyed, printed, or stencilled materials with one or more amino or substituted amino compounds, e. g. aniline, alkylated aniline, or alkylated phenylene diamines. Further, in U. S. application S. No. 449,082 filed 1st May, 1930, there is described the use for a similar purpose of substantially colorless or white alkylated amino diaryl bases, such for example as tetra-methyl diaminodiphenyl methane or other tetra-alkylated diaminodiphenyl methanes. Again, U. S. application S. No. 523,940 filed 19th March, 1931, describes the use of aralkylated aromatic amines, such for example as benzyl-ethyl-aniline, for increasing the fastness of colorations to the combined agencies of light and acid, while in U. S. application S. No. 523,941 filed 19th March, 1931, the use of certain mono acidyl derivatives of aliphatic diamines, and in U. S. application S. No. 590,982 filed 4th February, 1932, the use of aralkylamine bases and certain other bases, in which an amino group is not directly attached to an aryl residue or to a carbon itself attached to a second nitrogen atom, is described for the same purpose.

It has now been found that basic compounds containing an acidylamino group or an acid amide group, and in particular compounds containing at least one basic amino group, at least one aryl residue and at least one acidylamino group or acid amide group, the basic amino group or groups being preferably non-aromatically linked, are generally applicable for increasing the fastness of colorations and in particular in connection with colorations, for example dyeings, printings, or stencilings, produced on cellulose ester and ether materials with the above mentioned anthraquinone dyestuffs, particularly those containing free amino, alkyl amino or arylamino groups. Compounds of the aforesaid character possess the advantage of little liability to develop color on exposure to air or oxidizing agencies. These compounds may therefore be used without danger for increasing the fastness of pale colorations which would readily show any discoloration due to the development of color by the stabilizing agent. They further possess the very great advantage that in general they are of low volatility.

The present invention therefore broadly comprises improving the fastness of colorations on materials with the aid of compounds containing at least one acidylamino group or acid amide group, at least one basic amino group and at least one aryl residue group, and particularly with compounds containing an acidylated amino group or acid amide group which is aromatically linked, and a basic amino group which is preferably non-aromatically linked. Materials which have been treated with these compounds, or in which these compounds have been incorporated, but which are uncolored, are also within the scope of the present invention and may be colored subsequently in shades which are fast to acid and light. It will be appreciated that the compounds employed should be retained in the material throughout any subsequent finishing operation.

The compounds employed in accordance with the present invention may, of course, contain more than one acidylamino group or acid amide group and more than one basic amino group. Similarly they may contain more than one aryl nucleus. It has indeed been observed that increase in the number of acidyl-amino groupings or acid amide groupings in general reduces the volatility of the compound containing them. Acidylamino groups or acid amide groups may be attached indirectly to aryl nuclei but are preferably directly linked to such nuclei. They are preferably derived from aliphatic, aromatic or other carboxylic acids as in the case of the acetylamino group or the carboxylic amide group —CO NH$_2$, though they may be derived from other acids, for example carbonic acid as in the case of the urea group.

The basic amino groups may be attached directly to the aryl nuclei as for example in the above-mentioned para-acetylamino dimethylaniline, or they may be indirectly attached through suitable atoms or groups, e. g. methylene groups. The invention particularly contemplates the use of compounds in which basic amino groups are united to aryl nuclei through acidylamino groups, e. g. as in the case of ω-diethylamino-acetanilide. The basic amino groups may be primary, secondary or tertiary and the NH or NH$_2$ groups of the acidylamino groups or acid amide groups may or may not be substituted by aliphatic, araliphatic or other substituents.

As examples of compounds which may be used in accordance with the invention mention may be made of the following:—

Aralkylamines, or other ω-amino-aliphatically substituted aryl compounds, substituted in an aryl nucleus by acidylamino groups, e. g. p-acetylamino or p-benzoylamino-benzyldiethylamine,

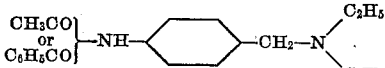

p-acetylaminophenyl-benzylethyl-amine,

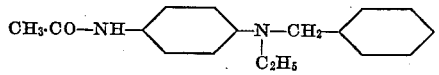

and p:p'-di-ω-aminomethyl-diphenylurea

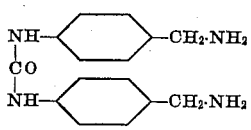

Arylamines substituted in the nucleus by acid amide groups, e. g. p-acetylamino-dimethylaniline

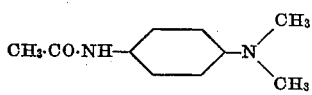

or dimethylaniline-p-carboxylic amide, ethylamide, or piperidide

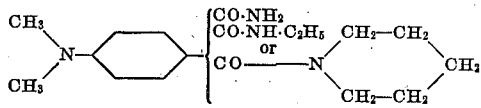

Acidylated aromatic and other amines substituted in the acidyl groups by basic amino groups, e. g. di-(ω-diethylamino-acetyl)-paraphenylene diamine

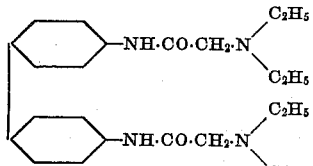

ω-(diethylamino)-acetanilide

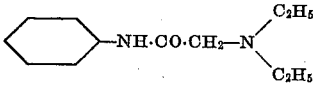

p-dimethylamino-benzoyl-benzylamine

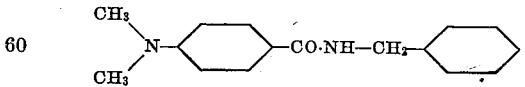

p-dimethylamino-benzoyl-aniline

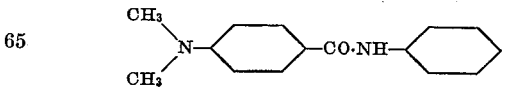

and p-dimethylamino-benzoyl-diamylamine

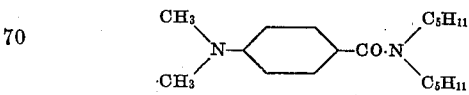

In improving the fastness of colorations on textile and other materials in accordance with the present invention other substances capable of improving the fastness of coloration, for instance the ureas, thioureas and guanidines of U. S. application S. No. 450,308 filed 6th May, 1930, the thiourea of U. S. application S. No. 593,884 filed 18th February, 1932, and the compounds mentioned in the other prior specifications referred to, with or without inorganic compounds having an alkaline reaction, that is to say, substances such for example as sodium carbonate, borax, disodium hydrogen phosphate, sodium acetate, sodium palmitate, or sodium oleate containing an inorganic base, may be applied to the materials in addition to, and either separately from or simultaneously with, the amines of the present invention. In the treatment of materials made of or containing cellulose esters such inorganic substances are preferably not sufficiently basic or alkaline, or are not applied in sufficient concentration to produce a deleterious degree of hydrolysis on the cellulose ester.

The amines of the present invention may be applied in any suitable manner, for example in the treatment of materials containing a cellulose ester or ether they may be absorbed from aqueous solutions of their salts, for example their hydrochlorides. The cellulose derivative may, if desired, absorb the amine while the former is in a swollen condition. The amines may also conveniently be applied in the form of aqueous emulsions or dispersions produced in any suitable manner, for instance by milling in aqueous media, or by pouring a solution containing an insoluble amine into water or by any of the methods described in U. S. Patents Nos. 1,618,413, 1,618,414, 1,694,413, 1,690,481, 1,803,008, 1,840,572, 1,716,721, and U. S. applications S. Nos. 390,423 filed 4th September, 1929, and 390,424 filed 4th September, 1929. From the point of view of ease of application and capacity for resisting removal from the materials, the invention particularly contemplates the use of bases having a substantive affinity for the materials under treatment.

Emulsions and dispersions of the amines may be directly prepared of a strength suitable for application to the textile materials. If desired, however, the amines may first be brought into the form of solid, powdered, paste, liquid or other more or less concentrated preparations capable of yielding, by dilution with water, soap solution, or the like, treatment baths containing the amino compounds in suitably dispersed form. These preparations which constitute an important feature of the present invention may be prepared for instance by evaporating or otherwise removing water from less concentrated preparations or by simple grinding or mixing the amino compounds with dispersing agents and/or protective colloids with or without water. Again their salts, for example the hydrochlorides, may be ground or mixed with dispersing agents and/or protective colloids whereby preparations may be obtained which yield very satisfactory dispersions on dissolving in water and liberating the free base by addition of alkali.

Compositions of matter may also be made up containing the amino base together with coloring matters, and particularly the coloring matters of the anthraquinone series containing free amino or alkyl amino groups. Such compositions which preferably contain the amino base and the dyestuff in dispersed form also form part of the present invention, and may be applied directly for the coloration of materials in fast shades.

The bases utilized in accordance with the present invention may be applied to or incorporated in textile or other materials at any suitable stage of their manufacture. For example, textile materials may be treated with emulsions, dispersions or solutions of the bases before or during dyeing or during a finishing operation or other after-treatment. The fixation of the amines of the present invention may further be improved by subjecting the treated materials to a steaming operation. In general it is sufficient to incorporate in the materials from 0.5 to 2 per cent. of the basic acidylamino compound based on the weight of the materials.

A further method of incorporating the amino base in artificial materials, and particularly artificial materials made of or containing cellulose acetate or other cellulose esters or ethers, consists in dissolving or otherwise incorporating the amino base in the spinning solution used in the manufacture of the materials. Thus, for example an acetone solution of cellulose acetate containing 2% of di-(ω-diethylamino-acetyl)-para-phenylene-diamine on the weight of the cellulose acetate may be spun according to dry spinning methods to produce cellulose acetate filaments which are capable of being directly dyed in fast shades with anthraquinone dyestuffs.

The following examples illustrate the invention without being in any way limitative:—

Example 1

100 grams of a paste consisting of 1 part of finely divided p-acetylamino-benzyl-diethylamine, 6 parts of water and 3 parts of Turkey red oil (50%) are heated with constant stirring with 1 litre of 2.5 grams per litre soap solution and are then strained through a filter cloth into a bath containing 30 litres of 2.5 grams per litre soap solution.

1 kilogram of cellulose acetate fabric dyed in a blue shade with 1.4-dimethylamino-anthraquinone is entered into the above bath and worked for ¾ hour while the temperature is gradually raised from 15° C. to 50° C. and then worked at about 80° C. for a further ¾ hour. The fabric is then washed off thoroughly and dried or otherwise finished as is desired or requisite. The treated fabric shows increased resistance to the combined action of light and the products of combustion of coal gas as compared with an untreated fabric of similar shade.

Example 2

100 grams of a paste consisting of 1 part of finely divided p-acetylamino-dimethylaniline, 6 parts of water and 3 parts of Turkey red oil (50%) are heated with stirring with 1 litre of 2.5 grams per litre soap solution and strained through a filter cloth into a dyebath containing 30 litres of 2.5 grams per litre soap solution and an equal quantity of a similar paste containing 10% of partially methylated 1:4:5:8-tetramino-anthraquinone.

1 kilogram of a cellulose acetate fabric which has previously been scoured is entered into the above dyebath at cold or lukewarm temperatures and the temperature raised slowly to 80° C. and maintained at about that temperature for about ¾ hour. The fabric is then washed off thoroughly and dried or otherwise treated as desired. The dyed and treated fabric shows markedly greater resistance to acidic influences than does a similar fabric dyed with the dyestuff alone.

Example 3

A cellulose acetate fabric is treated with 1% of 1-amino-4-methylamino-anthraquinone and 2% of di-(ω-diethylaminoacetyl)-p-phenylenediamine, the procedure followed being similar to that of Example 2. The dyed and treated fabric shows a considerably greater resistance to the combined action of light and gaseous fumes than does a shade produced by the dyestuff in the absence of the protective base.

Example 4

A solution of cellulose acetate containing 1% on the weight of the cellulose acetate of di-(ω-diethylaminoacetyl)-p-phenylenediamine is dry spun to form filaments. A fabric prepared from these filaments is dyed with 1% of its weight of 1:4-diethanolamino-anthraquinone and ½% of its weight of benzyl-ethyl-aniline, both the dyestuff and the benzyl-ethyl-aniline being applied by dispersion methods from the same bath. The goods are then washed off well and hydroextracted and finally treated in a bath containing 2 grams per litre of borax and dried. The goods so treated show very much more resistance to fading under acidic conditions than does cellulose acetate containing none of the base.

As already indicated the invention is of particular value in rendering fast to the combined agencies of light and acid colorations produced with anthraquinone derivatives, and especially those containing free amino, alkyl amino or arylamino groups. For this reason the process is most valuable in connection with treatment of materials, for example textile materials or films or foils made of or containing cellulose acetate or other cellulose esters or ethers, for instance cellulose formate, cellulose propionate, cellulose butyrate, or methyl, ethyl, or benzyl cellulose, or materials containing such cellulose derivatives associated with other fibres, such as wool, cotton, or silk. The invention may, however, be applied to the treatment of materials consisting wholly of wool, cotton, or silk or other fibres.

The term "non-aromatically linked basic amino group" as used in the claims connotes a basic amino group which, as in benzylamine, $C_6H_5CH_2NH_2$, is neither directly attached to a carbon atom of an aromatic nucleus nor attached thereto through the agency of a basic amino group which is itself directly attached to such a carbon atom. Similarly, the term "aromatically linked basic amino group" as used in the claims connotes a basic amino group which, as in the case of aniline, $C_6H_5NH_2$, is directly attached to a carbon atom of an aromatic nucleus.

What we claim and desire to secure by Letters Patent is:—

1. Process for improving the fastness of colorations produced with the aid of amino-anthraquinone dyestuffs on textile materials, which comprises incorporating in the materials a substantially colorless compound containing as a substituent in an aromatic nucleus a group selected from the group consisting of acidylamino and acid amide groups, said compound also containing a basic amino group linked thereto through a radicle selected from the group consisting of methylene, acidylamino and acid amide.

2. Process for improving the fastness of colorations produced with the aid of amino-anthraquinone dyestuffs on materials comprising cellulose acetate, which comprises incorporating in the materials a substantially colorless compound, free from aromatically linked basic amino groups, containing as a substituent in an aromatic nucleus a group selected from the group consisting of acidylamino and acid amide groups, said compound also containing a non-aromatically linked basic amino group.

3. Process for improving the fastness of colorations produced with the aid of amino-anthraquinone dyestuffs on materials comprising cellulose acetate, which comprises incorporating in the materials a substantially colorless compound containing as a substituent in an aromatic nucleus a group selected from the group consisting of acidylamino and acid amide groups, said compound also containing a non-aromatically linked basic amino group.

4. Process for improving the fastness of colorations produced with the aid of amino-anthraquinone dyestuffs on materials comprising cellulose acetate, which comprises incorporating in the materials a substantially colorless aralkylamine substituted in an aryl nucleus by a group selected from the group consisting of acidylamino and acid amide groups.

5. Process for improving the fastness of colorations produced with the aid of amino-anthraquinone dyestuffs on materials comprising cellulose acetate, which comprises incorporating in the materials a substantially colorless compound in which an aromatic nucleus contains as a substituent an amino group acidylated with an aliphatic acidyl group having as a substituent therein a basic amino group.

6. Process for improving the fastness of colorations produced with the aid of amino-anthraquinone dyestuffs on materials comprising cellulose acetate, which comprises incorporating di-($\omega$-diethyl-amino-acetyl)-p-phenylene-diamine in the materials.

7. Process for improving the fastness of colorations produced with the aid of amino-anthraquinone dyestuffs on materials comprising cellulose acetate, which comprises incorporating di-($\omega$-diethyl-amino-acetyl)-p-phenylene-diamine in the materials.

8. Textile materials of improved fastness to colorations produced with the aid of amino-anthraquinone dyestuffs, said textile materials having incorporated therein a substantially colorless compound containing as a substituent in an aromatic nucleus a group selected from the group consisting of acidylamino and acid amide groups, which compound also contains a basic amino group linked thereto through a radicle selected from the group consisting of methylene, acidylamino and acid amide.

9. Colored materials of improved fastness to colorations produced with the aid of amino-anthraquinone dyestuffs, said colored materials comprising an organic derivative of cellulose and having incorporated therein a substantially colorless aromatic compound free from aromatically linked basic amino groups, and containing as substituents in the same aryl nucleus an aliphatic group having a basic amino group as a substituent, and a group selected from the group consisting of acidylamino and acid amide groups.

10. Colored materials of improved fastness to colorations produced with the aid of amino-anthraquinone dyestuffs, said colored materials comprising cellulose acetate, and having incorporated therein a substantially colorless aromatic compound free from aromatically linked basic amino groups, and in which an aromatic nucleus contains as a substituent an amino group acidylated with an aliphatic acidyl group having as a substituent therein a basic amino group.

11. Colored materials of improved fastness to colorations produced with the aid of amino-anthraquinone dyestuffs, said colored materials comprising cellulose acetate, and having incorporated therein di-($\omega$-diethylamino-acetyl)-p-phenylene-diamine.

12. Materials comprising cellulose acetate colored with an amino-anthraquinone dyestuff, and having incorporated therein a substantially colorless compound containing as a substituent in an aromatic nucleus a group selected from the group consisting of acidylamino and acid amide groups, which compound also contains a non-aromatically linked basic amino group.

13. Materials comprising cellulose acetate colored with an amino-anthraquinone dyestuff, and having incorporated therein a substantially colorless aromatic compound free from aromatically linked basic amino groups and containing as substituents in the same aryl nucleus an aliphatic group having a basic amino group as a substituent, and a group selected from the group consisting of acidylamino and acid amide groups.

HENRY CHARLES OLPIN.
GEORGE HOLLAND ELLIS.